(12) United States Patent
Nishiguchi et al.

(10) Patent No.: US 6,475,366 B1
(45) Date of Patent: *Nov. 5, 2002

(54) CATIONICALLY ELECTRODEPOSITABLE COATING COMPOSITION

(75) Inventors: Shigeo Nishiguchi, Hiratsuka (JP); Koji Kamikado, Yokohama (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/716,245

(22) Filed: Nov. 21, 2000

(30) Foreign Application Priority Data

Nov. 24, 1999  (JP) .............................. 11-333503

(51) Int. Cl.$^7$ .............................. C25D 13/00
(52) U.S. Cl. ..................... 204/505; 204/506; 523/415
(58) Field of Search ................. 204/505, 506; 428/413; 523/415

(56) References Cited

U.S. PATENT DOCUMENTS

| | | | |
|---|---|---|---|
| 4,755,418 A | * 7/1988 | DebRoy et al. | 204/181.7 |
| 5,074,979 A | 12/1991 | Valko et al. | 204/181.7 |
| 5,630,922 A | * 5/1997 | Eswarakrishnan et al. | 204/506 |
| 5,744,521 A | * 4/1998 | Takasaki et al. | 204/505 |
| 5,972,189 A | * 10/1999 | McMurdie et al. | 204/506 |
| 6,303,707 B1 | * 10/2001 | Nishiguchi et al. | 525/528 |

* cited by examiner

Primary Examiner—Kishor Mayekar
(74) Attorney, Agent, or Firm—Wenderoth, Lind & Ponack, L.L.P.

(57) ABSTRACT

The present invention provides a cationically electrodepositable coating composition comprising as a cross-linking agent, a blocked polyisocyanate having a blocked isocyanate group represented by Formula (I):

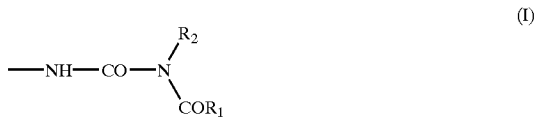

(wherein $R_1$ represents a hydrogen atom, methyl, ethyl or propyl, and $R_2$ represents methyl or ethyl) or a self cross-linking type base resin having the blocked isocyanate group represented by Formula (I) described above.

16 Claims, No Drawings

CATIONICALLY ELECTRODEPOSITABLE COATING COMPOSITION

The present invention relates to a cationically electrodepositable coating composition, more specifically to a cationically electrodepositable coating composition which comprises a specific blocked polyisocyanate cross-linking agent and has a low heating loss, a low gum soot property and a low temperature-curing property and which can form an electrodeposited coating film having a good coated surface smoothness.

Known as a cationically electrodepositable coating material is a thermosetting type cationically electrodepositable coating material comprising an amine-added epoxy resin and a blocked polyisocyanate as a cross-linking agent, and those obtained by blocking aromatic or aliphatic polyisocyanates with ether alcohol base blocking agents such as ethylene glycol butyl ether have so far been used as the blocked polyisocyanate from the viewpoints of a corrosion resistance of the coating film formed and a stability of the coating material. However, a cationically electrodepositable coating material using a polyisocyanate blocked with an ether alcohol base blocking agent as a cross-linking agent has the problems that a lot of gum and soot due to a heating loss content (a weight loss proportion of a coating film in curing by baking) are produced in a line oven and that the baking temperature is high.

On the other hand, a cationically electrodepositable coating material using a polyisocyanate blocked with a blocking agent of an oxime base such as methyl ethyl ketoxime and hexanone ketoxime as a cross-linking agent provides a coating film which can be cured at a relatively low temperature but has the problem that an aging stability of the coating material and a corrosion resistance of the coating film are inferior.

An object of the present invention is to provide a cationically electrodepositable coating material which has a low heating loss property and a low temperature-curing property and which is excellent in a stability as a coating material and a corrosion resistance of the coating film.

The present inventors have found that the object described above can be achieved by using a blocked isocyanate as an external or internal cross-linking agent component, which is formed by using some kind of a specific amide compound as a blocking agent, and they have come to complete the present invention.

Thus, the present invention provides a cationically electrodepositable coating composition (hereinafter referred to as the coating composition A of the present invention) comprising as a cross-linking agent, a blocked polyisocyanate having at least 0.1 blocked isocyanate group represented by Formula (I):

(I)

wherein $R_1$ represents a hydrogen atom, methyl, ethyl or propyl, and $R_2$ represents methyl or ethyl.

Further, the present invention provides a cationically electrodepositable coating composition (hereinafter referred to as the coating composition B of the present invention) comprising as a base resin, an active hydrogen-containing cationic resin having at least 0.1 blocked isocyanate group per molecule on the average represented by Formula (I) described above.

The coating compositions of the present invention shall be explained below in further details.

Coating Composition A of the Present Invention

The coating composition A of the present invention is a cationically electrodepositable coating composition comprising a cationic resin having an active hydrogen group capable of reacting an isocyanate group as a base resin and the blocked polyisocyanate having the blocked isocyanate group represented by Formula (I) described above as an external cross-linking agent.

Capable of being used as the active hydrogen-containing cationic resin used as the base resin in the coating composition A of the present invention are, for example, conventional cationically electrodepositable coating resins having an active hydrogen group such as a primary or secondary amino group and a hydroxyl group and a cationic group such as a primary amino group, a secondary amino group, a tertiary amino group and a quaternary ammonium group (when this cationic group contains active hydrogen, it can double as the active hydrogen group), which is required for making the resin water-soluble or water-dispersible, for example, resins of an epoxy base, an acryl base, a polybutadiene base, an alkid base and a polyester base. Among them, amine-added epoxy resins are particularly suitable.

The above amine-added epoxy resin includes, for example, (1) adducts of polyepoxide compounds to primary mono- and polyamines, secondary mono- and polyamines or primary and secondary mixed-polyamines (refer to, for example, U.S. Pat. No. 3,984,299); (2) adducts of polyepoxide compounds to secondary mono- and polyamines having a primary amino group which is reduced to ketimine (refer to, for example, U.S. Pat. No. 4,017,438); and (3) reaction products obtained by etherification reaction of polyepoxide compounds with hydroxyl compounds having a primary amino group which is reduced to ketimine (refer to, for example, Japanese Patent Application Laid-Open No. 43013/1984).

The polyepoxide compound used for producing the amine-added epoxy resin described above is a compound having at least two epoxy groups in a molecule and is suitably a compound having a number average molecular weight falling in a range of usually at least 200, preferably 400 to 4000 and more preferably 800 to 2000. In particular, a compound obtained by reacting a polyphenol compound with epichlorohydrin is preferred. The polyphenol compounds which can be used for producing the above polyepoxide compounds include, for example, bis(4-hydroxyphenyl)-2,2-propane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, tetra(4-hydroxyphenyl)-1,1,2,2-ethane, 4,4-dihydroxydiphenylsulfone, phenol novolak and cresol novolak.

The above polyepoxide compounds may be those reacted partly with polyols, polyetherpolyols, polyesterpolyols, polyamideamines, polycarboxylic acids and polyisocyanate compounds. Further, they may be those graft-polymerized with ε-caprolactone and acryl monomers.

The blocked polyisocyanate used as a cross-linking agent in the coating composition A of the present invention can be produced by blocking at least one isocyanate group of a polyisocyanate compound having at least two isocyanate groups (NCO) in a molecule with an amide compound represented by the following Formula (II):

$$R_1\text{—CO—NH—}R_2 \quad (II)$$

wherein $R_1$ and $R_2$ are synonymous with those defined above.

The polyisocyanate described above includes, for example, aromatic, aliphatic or alicyclic polyisocyanate compounds such as tolylenediisocyanate, xylilenediisocyanate, phenylenediisocyanate, bis-(isocyanatemethyl)cyclohexane, tetramethylenediisocyanate, hexamethylenediisocyanate, methylenediisocyanate and isophoronediisocyanate, and terminal isocyanate group-containing compounds obtained by reacting excess amounts of these polyisocyanate compounds with low molecular active hydrogen-containing compounds such as ethylene glycol, propylene glycol, trimethylolpropane, hexanetriol and castor oil. Among these polyisocyanate compounds, suited are aromatic diisocyanates, particularly diphenylmethane-2,4'-diisocyanate, diphenylmethane-4,4'-diisocyanate (usually called MDI) and a mixture (usually called crude MDI) of diphenylmethane-4,4'-diisocyanate with diphenylmethane-2,4'-diisocyanate and polymethylenepolyphenylisocyanate.

The amide compound represented by Formula (II) described above which is used for blocking these polyisocyanate compounds includes, for example, N-methylacetamide, N-ethylacetamide, N-methylpropionamide and N-methylformamide, and they can be used alone or in combination of two or more kinds thereof. Substantially all isocyanate groups of the polyisocyanate compound are preferably blocked with the above amide compound in order to reduce a heating loss, but a part of the isocyanate groups may be blocked, if necessary, with other conventional blocking agents which have so far been used. The blocking agents which can be used in combination include, for example, lactam base compounds such as ε-caprolactam and γ-butyrolactam; oxime base compounds such as methyl ethyl ketoxime and cyclohexanoneoxime; phenol base compounds such as phenol, p-t-butylphenol and cresol; aliphatic alcohols such as n-butanol and 2-ethylhexanol; aromatic alkylalcohols such as phenylcarbinol and methylphenylcarbitol; and ether alcohol base compounds such as ethylene glycol monobutyl ether. Among them, the compounds having a relatively low molecular weight of 140 or less are suited.

A use amount of these blocking agents to the polyisocyanate compound falls suitably in a range of 1 to 1.3 mole per equivalent of the polyisocyanate group in total.

The polyisocyanate compound described above can be reacted with the blocking agent by a conventionally known method. The resulting blocked polyisocyanate is stable at a room temperature, but when it is heated at a baking temperature of the coating film, a temperature of usually about 100 to about 200° C., preferably about 120 to about 160° C., it dissociates the blocking agent to reproduce a free isocyanate, and this is reacted with an active hydrogen group of the base resin contained in the coating composition to cure the resin.

The coating composition A of the present invention can be prepared by neutralizing the active hydrogen group-containing cationic resin described above with a neutralizing agent such as aliphatic carboxylic acid to make the above resin water-soluble or water dispersible and then mixing it with the blocked polyisocyanate compound described above. The neutralization described above may be carried out either before or after mixing the above resin with the blocked polyisocyanate. Acetic acid and formic acid are particularly suited as the neutralizing agent from the viewpoints of a finished appearance, a throwing property and a low temperature-curing property of the coating film.

A blending proportion of the blocked isocyanate to the active hydrogen group-containing cationic resin in the coating composition A of the present invention can be allowed to fall in a range of usually 5 to 40% by weight, preferably 15 to 30% by weight.

Coating Composition B of the Present Invention

The coating composition B of the present invention is a thermosetting type cationically electrodepositable coating composition comprising as a base resin, a cationic resin of a self (internal) cross-linking type having both the blocked isocyanate group represented by Formula (I) described above and an active hydrogen group in a molecule.

The cationic resin described above can be produced, for example, by reacting a resin having an active hydrogen group such as a primary or secondary amino group and a hydroxyl group and a cationic group such as a primary amino group, a secondary amino group, a tertiary amino group and a quaternary ammonium group (when this cationic group contains active hydrogen, it can double as the active hydrogen group) with a polyisocyanate compound which is half-blocked with the amide compound represented by Formula (II) described above to introduce the blocked isocyanate group represented by Formula (I) described above into the above resin. This reaction can be carried out until a free isocyanate group is not substantially detected in the reaction mixture (the presence of an isocyanate group can readily be confirmed by means of infrared spectral analysis).

The amine-added epoxy resin given as the base resin in the coating composition A is suited as the active hydrogen group-containing cationic resin used in the present invention. The aromatic, aliphatic or alicyclic polyisocyanate compounds described in the coating composition A of the present invention are given as the polyisocyanate compound described above. Among them, aromatic diisocyanates such as MDI and crude MDI are suited.

The self (internal) cross-linking type cationic resin thus produced can contain at least 0.1 group, preferably 0.2 to 2.0 groups and more preferably 0.3 to 1.5 group of the blocked isocyanate group represented by Formula (I) per a molecule on the average.

The half-blocked polyisocyanate compound described above can be obtained by reacting MDI or crude MDI with the amide compound represented by Formula (II), if necessary, in an inert organic solvent (for example, ester base solvents, ketone base solvents, aromatic solvents and ether base solvents) which does not substantially react with MDI and the amide compound at a temperature of about 20 to 150° C., preferably 30 to 100° C. for about 10 minutes to 24 hours, preferably about 20 minutes to 15 hours. In this case, a use proportion of the above amide compound can be allowed to fall usually in a range of 1 to 1.98 mole, preferably 1.05 to 1.95 mole per mole of MDI or crude MDI.

The self (internal) cross-linking type cationic resin produced in such manner as described above is used as the base resin for the coating composition B of the present invention by neutralizing with a neutralizing agent such as aliphatic carboxylic acid in the same manner as described in the coating composition A of the present invention to thereby make it water-soluble or water-dispersible. Acetic acid and formic acid are particularly suited as the neutralizing agent described above from the viewpoints of a finished appearance, a throwing property and a low temperature-curing property of the coating film.

The coating composition A of the present invention and the coating composition B of the present invention (hereinafter called all together the coating composition of the present invention) can further contain, if necessary, a tin compound as a cross-linking acceleration catalyst. The above tin compound includes, for example, organic tin oxides such as dibutyltin oxide and dioctyltin oxide; and aliphatic acid or aromatic carboxylic acid salts of dialkyltin such as dibutyltin dilaurate, dioctyltin dilaurate, dibutyltin diacetate, dioctyltin benzoateoxy, dibutyltin benzoateoxy, dioctyltin dibenzoate and dibutyltin dibenzoate. Among them, dialkyltin aromatic carboxylic acid salts are suitable from a viewpoint of a low temperature curability.

A content of the tin compound in the coating composition of the present invention shall not strictly be restricted and can be changed in a wide range according to performances required to the electrodepositable coating material. Usually, the tin content falls suitably in a range of 0 to 8 parts by weight, preferably 0.05 to 5 parts by weight per 100 parts by weight of the resin solid matters contained in the coating composition of the present invention.

Further, a bismuth compound can be added as a rust preventive to the coating composition of the present invention. The kind of the bismuth compound which can be added shall not specifically be restricted and, to be specific, includes inorganic bismuth compounds such as bismuth hydroxide, basic bismuth carbonate, bismuth nitrate and bismuth silicate. Among them, bismuth hydroxide is particularly preferred.

Further, capable of being used as well are organic acid bismuth salts which are produced by reacting two or more kinds of organic acids with such bismuth compounds as described above and in which at least one of the above organic acids is an aliphatic hydroxycarboxylic acid. The organic acids which can be used for producing the organic acid bismuth salts include, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid and citric acid.

The inorganic bismuth compounds and the organic acid bismuth salts described above each can be used alone or may be used in combination of two or more kinds thereof.

A content of these bismuth compounds in the coating composition of the present invention shall not strictly be restricted and can be changed over a wide range according to performances required to the coating material. Usually, it can be allowed to fall in a range of 0.01 to 10% by weight, preferably 0.05 to 5% by weight based on the resin solid matters contained in the coating composition of the present invention.

Further, the coating composition of the present invention can be blended, if necessary, with coating material additives such as a color pigment, an extender pigment, a rust preventive pigment, an organic solvent, a pigment dispersant and a coated surface-controlling agent.

The coating composition of the present invention can be coated on a desired base material surface by electrodeposition coating. In general, electrodeposition coating can be carried out on the condition of a loaded voltage of 100 to 400 V in an electrodeposition bath controlled usually to a bath temperature of about 15 to about 35° C., which comprises the electrodepositable coating composition of the present invention diluted by adding deionized water so that the solid matter concentration becomes about 5 to about 40% by weight, preferably 15 to about 25% by weight and controlled to a pH falling in a range of 5.5 to 9.0.

A film thickness of an electrodeposited coating film capable of being formed using the coating composition of the present invention shall not specifically be restricted and falls suitably in a range of usually 10 to 40 $\mu$m, particularly 15 to 30 $\mu$m in terms of a dried coating film. A baking temperature of the coating film falls suitably in a range of usually about 100 to about 200° C., preferably about 120 to about 160° C.

The electrodeposited coating film capable of being formed using the coating composition of the present invention has a low heating loss and is excellent in a low temperature curability as well as a corrosion resistance. In addition thereto, the coating composition of the present invention has a good storage stability and is useful, for example, as an undercoating material for car bodies, car arts and building members.

The present invention shall be explained below in further details with reference to examples, but the present invention shall not be restricted by them. "%" shows "% by weight".

PRODUCTION EXAMPLE 1

Added to 1010 g of Epikote 828EL (trade name, an epoxy resin, marketed by Oil Shell Epoxy Co., Ltd.) were 390 g of bisphenol A and 0.2 g of dimethylbenzylamine to react them at 130° C. until the epoxy equivalent became 800. Next, added were 260 g of $\epsilon$-caprolactone and 0.03 g of tetrabutoxytitanium, and the temperature was elevated to 170° C. Sampling was carried out with the passage of time while maintaining this temperature to trace an amount of unreacted $\epsilon$-caprolactone by measurement of an infrared spectrum, and the temperature was lowered to 120° C. at a point of time when the reaction rate reached 98% or more. Next, added were 160 g of diethanolamine and 65 g of a methyl isobutyl diketime-reduced product of diethylenetriamine to react them at 120° C. for 4 hours, and then 420 g of butyl cellosolve was added to obtain a resin No. 1 (a plasticization-modified epoxy resin) having an amine value of 58 and a resin solid content of 80%.

PRODUCTION EXAMPLE 2

Added to 250 g of MDI was 40 g of methyl isobutyl ketone, and the temperature was elevated to 70° C. Slowly added was 110 g of methylacetamide, and then the temperature was elevated to 90° C. This temperature was maintained for 5 hours to thereby obtain a cross-linking agent A (an MDI cross-linking agent (a partially blocked isocyanate compound)) having a solid content of 90%.

PRODUCTION EXAMPLE 3

Added to 1010 g of Epikote 828EL (trade name, an epoxy resin, marketed by Oil Shell Epoxy Co., Ltd.) were 390 g of bisphenol A and 0.2 g of dimethylbenzylamine to react them at 130° C. until the epoxy equivalent became 800. Next, added were 260 g of $\epsilon$-caprolactone and 0.03 g of tetrabutoxytitanium, and the temperature was elevated to 170° C. Sampling was carried out with the passage of time while maintaining this temperature to trace an amount of unreacted $\epsilon$-caprolactone by measurement of an infrared spectrum, and the temperature was lowered to 100° C. at a point of time when the reaction rate reached 98% or more. Next, added were 399 g of the partially blocked cross-linking agent A produced in Production Example 2, and sampling was carried out with the passage of time while maintaining 100° C. to continue the reaction until it was confirmed by measurement of an infrared spectrum that no more absorption of unreacted isocyanate was observed.

Next, added were 160 g of diethanolamine and 65 g of the methyl isobutyl diketime-reduced product of diethylenetriamine to react them at 120° C. for 4 hours, and then 447 g of butyl cellosolve was added to obtain a resin No. 2 (a curing agent-added type plasticization-modified epoxy resin) having an amine value of 48 and a resin solid content of 80%.

PRODUCTION EXAMPLE 4

Added to 270 g of M-200 (trade name, crude MDI, marketed by Mitsui Chemicals Inc.) was 46 g of methyl isobutyl ketone, and the temperature was elevated to 70° C. Slowly added was 146 g of methylacetamide, and then the temperature was elevated to 90° C. Sampling was carried out with the passage of time while maintaining this temperature, and it was confirmed by measurement of an infrared spectrum that no more absorption of unreacted isocyanate was observed, whereby obtained was a cross-linking agent B (a crude MDI cross-linking agent) having a solid content of 90%.

PRODUCTION EXAMPLE 5

Added to 270 g of M-200 (trade name, crude MDI, marketed by Mitsui Chemicals Inc.) was 45 g of methyl isobutyl ketone, and the temperature was elevated to 70° C. Slowly added were 73 g of methylacetamide and then 59 g of methylformamide, and then the temperature was elevated to 90° C. Sampling was carried out with the passage of time while maintaining this temperature, and it was confirmed by measurement of an infrared spectrum that no more absorption of unreacted isocyanate was observed, whereby obtained was a cross-linking agent C (a crude MDI cross-linking agent) having a solid content of 90%.

PRODUCTION EXAMPLE 6

Added to 250 g of MDI was 44 g of methyl isobutyl ketone, and the temperature was elevated to 70° C. Slowly added was 146 g of methylacetamide, and then the temperature was elevated to 90° C. Sampling was carried out with the passage of time while maintaining this temperature, and it was confirmed by measurement of an infrared spectrum that no more absorption of unreacted isocyanate was observed, whereby obtained was a cross-linking agent D (an MDI cross-linking agent) having a resin solid content of 90%.

PRODUCTION EXAMPLE 7

Added to 270 g of M-200 (trade name, crude MDI, marketed by Mitsui Chemicals Inc.) was 92 g of methyl isobutyl ketone, and the temperature was elevated to 70° C. Slowly added was 562 g of oleic acid amide, and then the temperature was elevated to 90° C. Sampling was carried out with the passage of time while maintaining this temperature, and it was confirmed by measurement of an infrared spectrum that no more absorption of unreacted isocyanate was observed, whereby obtained was a cross-linking agent E (a crude MDI cross-linking agent) having a solid content of 90%.

PRODUCTION EXAMPLE 8

Added to 270 g of M-200 (trade name, crude MDI, marketed by Mitsui Chemicals Inc.) was 40 g of methyl isobutyl ketone, and the temperature was elevated to 70° C. Slowly added was 92 g of ethanol, and then the temperature was elevated to 90° C. Sampling was carried out with the passage of time while maintaining this temperature, and it was confirmed by measurement of an infrared spectrum that no more absorption of unreacted isocyanate was observed, whereby obtained was a cross-linking agent F (a crude MDI cross-linking agent) having a solid content of 90%.

PRODUCTION OF CLEAR EMULSION

Blended and homogeneously stirred were 87.5 g (70 g in terms of the resin solid matter) of the resin No. 1 obtained in Production Example 1 described above, 33.3 g (30 g in terms of the resin solid matter) of the cross-linking agent A (methylacetamide-blocking product of crude MDI) obtained in Production Example 2, 2.5 g of dibutyltin dibenzoate (solid content: 40%) and 15 g of 10% acetic acid, and then 156 g of deionized water was dropwise added in about 15 minutes while vigorously stirring to obtain a clear emulsion (a) for cationic electrodeposition having a solid content of 34.0%. Similarly, emulsions (b), (c), (d), (e) and (f) were obtained in such combinations as described in Table 1.

TABLE 1

| Emulsion name | Example 1 (a) | Example 2 (b) | Example 3 (c) | Example 4 (d) | Comparative Example 1 (e) | Comparative Example 2 (f) |
| --- | --- | --- | --- | --- | --- | --- |
| Resin No. 1 | 87.5 | 87.5 | 87.5 | | 87.5 | 87.5 |
| Resin No. 2 | | | | 106.3 | | |
| Cross-linking agent B | 33.3 | | | 16.7 | | |
| Cross-linking agent C | | 33.3 | | | | |
| Cross-linking agent D | | | 33.3 | | | |
| Cross-linking agent E | | | | | 33.3 | |
| Cross-linking agent F | | | | | | 33.3 |

Note:
Numerical values in this table are expressed in gram.

Production of Pigment-dispersed Paste

Added to 5.83 g of a 60% quaternarized ammonium-added epoxy resin were 14.5 g of titanium white, 0.4 g of carbon black, 7.0 g of an extender pigment, 2.0 g of lead silicate and 22.4 g of deionized water to obtain a pigment-dispersed paste having a solid content of 55.0%.

Examples and Comparative Examples

Example 1

Added to 297 g of the clear emulsion (a) for cationic electrodeposition were 49.8 g of the pigment-dispersed paste and 295.2 g of deionized water to obtain a cationically electrodepositable coating material having a solid content of 20%.

Examples 2 to 5 and Comparative Examples 1 and 2

Added to each of the clear emulsions (b), (c), (d), (e) and (f) for cationic electrodeposition were the pigment-dispersed paste and deionized water in the same blending amounts as in Example 1 to obtain cationically electrodepositable coating materials having a solid content of 20%.

Coating Test

A cold-rolled dull steel plate of 0.8×150×70 mm subjected to chemical conversion treatment with Palbond (trade name, a zinc phosphate treating agent, marketed by Nihon Parkerizing Co., Ltd.) was dipped in the respective cationically electrodepositable coating materials obtained in Examples and Comparative Examples described above to carry out electrodepositable coating using them as a cathode. Then, baking was carried out at ambient temperatures of two stages and a baking time of 20 minutes by means of an electric hot air dryer. The performance test results of the coated plates thus obtained are shown in Table 2.

TABLE 2

| Item | Baking temperature | Example 1 | Example 2 | Example 3 | Example 4 | Comparative Example 1 | Comparative Example 2 |
|---|---|---|---|---|---|---|---|
| Heating loss: % by weight (*1) | 150° C. - 20 min. | 4.8 | 4.7 | 4.7 | 4.7 | 9.5 | 4.5 |
|  | 170° C. - 20 min. | 7.8 | 7.2 | 7.7 | 7.8 | 18.3 | 7.2 |
| Low temperature curability (*2) | 150° C. - 20 min. | ○ | ○ | ○ | ○ | ○ | X |
|  | 170° C. - 20 min. | ○ | ○ | ○ | ○ | ○ | ○ |
| Corrosion resistance (*3) | 150° C. - 20 min. | ○ | ○ | ○ | ○ | Δ | X |
|  | 170° C. - 20 min. | ○ | ○ | ○ | ○ | ○ | ○ |

Performance Test Methods (*1) Heating Loss

Preheating was carried out after electrodeposition at 105° C. for 3 hours. Then, drying by baking was carried out to show a proportion of a loss in weight. It was calculated according to the following calculation equation:

Weight of coated plate: ①

Weight of coated plate after preheating: ②

Weight of coated plate after drying by baking: ③

$$((② - ③)/(② - ①)) \times 100\% \text{ by weight}$$

(*2) Low Temperature Curability

The coated surfaces of the electrodepositably coated plates baked at the respective baking temperatures were rubbed by 20 cycles in a length of about 3 to 4 cm at a pressure of 3.92 mPa (about 4 kgf/cm2) by means of a 4 shhet-folded gauze impregnated with acetone, and then the coated surface appearance was visually evaluated on the following conditions:

○: no scratches are observed on the coated surface

Δ: scratches are observed on the coated surface but the base surface can not be seen x: coating film is dissolved, and the base surface can be seen (*3) Corrosion Resistance Crosscut scratches were provided on the electrodepositably coating films of the coated plates baked at the respective baking temperatures by means of a knife so that it reached the base surface, and they were subjected to a 840 hour salt water-spraying resistant test according to JIS Z-2371 to evaluate a width of rust and blister produced in the cut part according to the following criteria:

○: maximum width of rust and blister is less than 2 mm (one side) from cut part

Δ: maximum width of rust and blister is 2 mm or more and less than 3 mm (one side) from cut part, and blister is pretty markedly observed on the flat part x: maximum width of rust and blister is 3 mm or more from cut part, and blister was observed to be produced on the whole coated surface

What is claimed is:

1. A cationically electrodepositable coating composition comprising as a cross-linking agent, a blocked polyisocyanate having at least 0.1 blocked isocyanate group represented by Formula (I):

wherein $R_1$ represents a hydrogen atom, methyl, ethyl or propyl, and $R_2$ represents methyl or ethyl.

2. The cationically electrodepositable coating composition as described in claim 1, wherein the blocked polyisocyanate is obtained by blocking at least one of isocyanate groups of a polyisocyanate compound with an amide compound represented by Formula (II):

wherein $R_1$ and $R_2$ are synonymous with those defined in claim 1.

3. The cationically electrodepositable coating composition as described in claim 2, wherein the polyisocyanate compound is an aromatic diisocyanate.

4. The cationically electrodepositable coating composition as described in claim 2, wherein the amide compound is N-methylacetamide, N-ethylacetamide, N-methylpropionamide or N-methylformamide.

5. The cationically electrodepositable coating composition as described in claim 1, comprising an amine-added epoxy resin as a base resin.

6. The cationically electrodepositable coating composition as described in claim 1, further comprising a dialkyltin aromatic carboxylic acid salt as a cross-linking accelerating agent.

7. A cationically electrodepositable coating composition comprising as a base resin, an active hydrogen-containing cationic resin having at least 0.1 blocked isocyanate group per molecule on the average represented by Formula (I):

wherein $R_1$ represents a hydrogen atom, methyl, ethyl or propyl, and $R_2$ represents methyl or ethyl.

8. The cationically electrodepositable coating composition as described in claim 7, wherein the base resin is a self (internal) cross-linking type cationic resin obtained by half-blocking an active hydrogen-containing cationic resin with an amide compound represented by Formula (II):

wherein $R_1$ and $R_2$ synonymous with those defined in claim 7.

9. The cationically electrodepositable coating composition as described in claim 8, wherein the polyisocyanate compound is an aromatic diisocyanate.

10. The cationically electrodepositable coating composition as described in claim 8, wherein the amide compound is N-methylacetamide, N-ethylacetamide, N-methylpropionamide or N-methylformamide.

11. The cationically electrodepositable coating composition as described in claim 8, wherein the active hydrogen-containing cationic resin is an amine-added epoxy resin.

12. The cationically electrodepositable coating composition as described in claim 7, wherein the active hydrogen-containing cationic resin contains 0.2 to 2.0 blocked isocyanate groups per molecule on the average represented by Formula (I).

13. The cationically electrodepositable coating composition as described in claim 7, further comprising a dialkyltin aromatic carboxylic acid salt as a cross-linking accelerating agent.

14. The cationically electrodepositable coating composition as described in claim 7, further comprising as a rust preventive, a bismuth compound selected from the group consisting of inorganic bismuth compounds and organic acid bismuth salts.

15. A cationically electrodepositable bath comprising the cationically electrodepositable coating composition as described in claim 1 or 7.

16. A cationically electrodepositable coating method characterized by using the cationically electrodepositable coating composition as described in claim 1 or 7.

* * * * *